R. WÜSTER.
FILTERING APPARATUS.
APPLICATION FILED AUG. 2, 1920.

1,386,340.

Patented Aug. 2, 1921.

Inventor
Robert Wüster

UNITED STATES PATENT OFFICE.

ROBERT WÜSTER, OF DASSEL, GERMANY.

FILTERING APPARATUS.

1,386,340. Specification of Letters Patent. Patented Aug. 2, 1921.

Application filed August 2, 1920. Serial No. 400,828.

*To all whom it may concern:*

Be it known that I, ROBERT WÜSTER, merchant, residing at Dassel on the Solling, Republic of Germany, have invented certain new and useful Improvements in Filtering Apparatus, for which I have filed an application in Germany, Mar. 16, 1918, and of which the following is a specification.

My invention relates to improvements in filtering apparatus, and more particularly in filtering apparatus of that class in which filtering is assisted by producing a difference of pressure at opposite sides of the filtering medium. The object of the improvements is to provide an apparatus which is simple in construction and operation, and particularly adapted for use in households and small factories. With this object in view the invention consists in constructing the filtering apparatus of telescoping receptacles having a filtering partition and adapted to receive one the non-filtered liquid and the other one the filtered liquid, the difference of pressure, ordinarily a partial vacuum, being produced by moving said receptacles relatively to each other. In the most simple construction such relative movement is brought about by hand, for which purpose one of the receptacles is provided with a handle.

Figure 1:
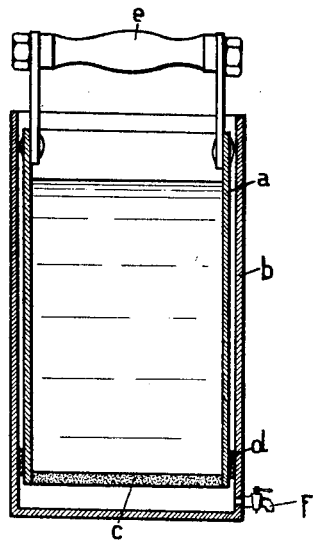
Figure 2:
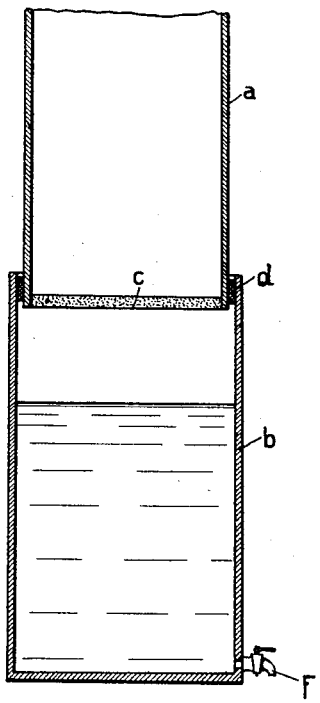

In order that my invention be more clearly understood, an example embodying the same has been shown in the accompanying drawing, in which the same letters of reference have been used in all the views to indicate corresponding parts. In said drawing, Figure 1, is a vertical section of the apparatus showing the parts in the position ready for filtering, and Fig. 2, is a similar section showing the parts in the position after filtering.

In the example shown in the figures the apparatus consists of a receptacle $b$ preferably in the form of a cylinder and a receptacle $a$ telescoping therein and provided with a filtering wall $c$. In the preferred form shown in the figures the filtering wall is provided at the bottom of the receptacle, and as shown it forms the said bottom. But I wish it to be understood that my invention is not limited to this feature nor to the form of the filter shown in the figures. The receptacles $a$ and $b$ fit one within the other in an air tight manner for which purpose a ring $d$ is connected with the receptacle $a$. As shown, the receptacle $a$ has a handle $e$ secured thereto for operation thereof by hand. But it should be understood that the invention is not limited to hand operated means.

The operation of the apparatus is as follows: Prior to filtering, the inner receptacle $a$ is pushed downward into the outer receptacle and into the position shown in Fig. 1, whereupon the liquid to be filtered is filled into the inner receptacle. Now the receptacle $a$ is gradually retracted, so that a partial vacuum is produced within the receptacle $b$ and below the filter $c$, which draws the liquid from the receptacle $a$ and through the filter $c$. The filtered liquid is collected within the receptacle $b$, from which it is withdrawn either by entirely retracting the receptacle $a$ or through a cock or any suitable valve $f$.

While in describing the invention reference has been made to a particular example embodying the same, I wish it to be understood that my invention is not limited to the construction shown in the figures.

I claim:

1. A filtering apparatus comprising a pair of telescoping receptacles fitting one within the other in an air-tight manner and adapted to receive one the liquid to be filtered and the other one the filtered liquid and movable relatively to each other, the receptacle designed to receive the liquid to be filtered having a filter formed in its wall.

2. A filtering apparatus comprising a pair of telescoping receptacles fitting one within the other in an air-tight manner and adapted to receive one the liquid to be filtered and the other one the filtered liquid and movable relatively to each other, the receptacle designed to receive the liquid to be filtered having a filter formed in its bottom.

3. A filtering apparatus comprising a pair of telescoping receptacles fitting one within the other in an air-tight manner and adapted to receive one the liquid to be filtered and the other one the filtered liquid and movable relatively to each other, the receptacle designed to receive the liquid to be filtered having a filter formed in its wall, and operating means provided on one of said receptacles.

In testimony whereof I have affixed my signature in presence of two witnesses.

ROBERT WÜSTER.

Witnesses:
 WILHELM LEHRKE,
 WILLI FAHN.